United States Patent
Moon

(10) Patent No.: US 11,951,999 B2
(45) Date of Patent: Apr. 9, 2024

(54) CONTROL UNIT FOR VEHICLE AND ERROR MANAGEMENT METHOD THEREOF

(71) Applicant: Hyundai AutoEver Corp., Seoul (KR)

(72) Inventor: Jin Woo Moon, Seoul (KR)

(73) Assignee: HYUNDAI AUTOEVER CORP., Seoul (KR)

(*) Notice: Subject to any disclaimer, the term of this patent is extended or adjusted under 35 U.S.C. 154(b) by 296 days.

(21) Appl. No.: 17/518,853

(22) Filed: Nov. 4, 2021

(65) Prior Publication Data

US 2022/0185301 A1  Jun. 16, 2022

(30) Foreign Application Priority Data

Dec. 15, 2020 (KR) .................. 10-2020-0175369

(51) Int. Cl.
*B60W 50/02* (2012.01)
*G06F 11/07* (2006.01)
*G06F 11/14* (2006.01)

(52) U.S. Cl.
CPC ..... *B60W 50/0225* (2013.01); *G06F 11/0739* (2013.01); *G06F 11/0766* (2013.01); *G06F 11/1438* (2013.01); *B60W 2556/45* (2020.02)

(58) Field of Classification Search
CPC ........... B60W 50/0225; B60W 2556/45; G06F 11/0739; G06F 11/0766; G06F 11/1438
See application file for complete search history.

(56) References Cited

U.S. PATENT DOCUMENTS

2019/0155678 A1* 5/2019 Hsiong .................. G06N 3/045
2022/0038902 A1* 2/2022 Mueck .................... G06F 21/57

FOREIGN PATENT DOCUMENTS

KR          10-1584213 B1      1/2016
KR     10-2016-0076270 A       6/2016

* cited by examiner

*Primary Examiner* — Michael D Lang
(74) *Attorney, Agent, or Firm* — Bridgeway IP Law Group, PLLC; Jihun Kim

(57) ABSTRACT

Proposed is a method of managing an error of a control unit for a vehicle, the method including: collecting an error; converting the collected error into a database in a form required for a diagnosis and debugging; and performing a recovery mechanism by interworking a platform health management cluster (PHM), a statement management cluster (SM), and an execution management cluster (EM), in which the collecting of the error includes: collecting a user error occurring in an application for a vehicle; collecting a platform error occurring in at least one of the platform health management cluster (PHM), the statement management cluster (SM), and the execution management cluster (EM); or collecting an integrated error according to whether a network management cluster (NM), a time synchronization cluster (TS), and a persistency cluster (PER) are normally operated.

13 Claims, 6 Drawing Sheets

CONTROL UNIT FOR VEHICLE AND ERROR MANAGEMENT METHOD THEREOF

CROSS-REFERENCE TO RELATED APPLICATIONS

This application claims priority to and the benefit of Korean Patent Application No. 10-2020-0175369 filed in the Korean Intellectual Property Office on Dec. 15, 2020, the entire contents of which are incorporated herein by reference.

TECHNICAL FIELD

The present invention relates to a control unit for a vehicle, and an error management method thereof.

BACKGROUND ART

An environment requires many computing performance. Power and cost effectiveness are important parts, but High Performance Computing (HPC) in the safety area faces various problems. In order to solve the problems, it is necessary to adopt the technology that the ECU cannot utilize and it is necessary to take full advantage of innovative technologies. AUTomotive Open System Architecture (AUTOSAR) adaptive platform dynamically manages resources and communication, distributes application programs while reducing effort for software development and integration, and allows a system integrator to carefully integrate the software to reduce the risk of bugs and ensures safety. The dynamic operation of the application program is limited by the constraints specified in the application program manifest. The dynamic allocation of the resources and the communication path during the execution is possible only with a defined method within a configured range. The implementation of the AUTOSAR adaptive platform limits the dynamic function in the configuration of the software to predetermination of processes, dynamic memory limit to a startup phase, scheduling policies in addition to priority-based scheduling, fixed allocation of processes for a Central Processing Unit (CPU, access to an existing file, restriction of the use of the Adaptive Platform (AP) Application Programming Interface (API), and the execution of an authorized code.

PRIOR ART LITERATURE

Patent Document (Patent Document 1) Korean Patent Application Publication No. 10-2016-0076270 (published on Jun. 30, 2016), entitled Multicore System for Vehicle (Patent Document 2) Korean Patent No. 10-1584213 (registered on Jan. 5, 2016), entitled Apparatus and Method of Setting Data Communication Flow in AUTOSAR Platform

SUMMARY OF THE INVENTION

The present invention has been made in an effort to provide a control unit for a vehicle which actively handles an error, and an error management method thereof.

An exemplary embodiment of the present invention provides a method of managing an error of a control unit for a vehicle, the method including: collecting an error; converting the collected errors into a database in a form required for a diagnosis and debugging; and performing a recovery mechanism by interworking with a platform health management cluster PHM, a statement management cluster SM, and an execution management cluster EM, in which the collecting of the error includes: collecting a user error occurring in an application for a vehicle; collecting a platform error occurring in at least one of the platform health management cluster PHM, the statement management cluster SM, and the execution management cluster EM; or collecting an integrated error according to whether a network management cluster NM, a time synchronization cluster TS, and a persistency cluster PER are normally operated.

In the exemplary embodiment, the method may further include periodically monitoring whether the error occurs.

In the exemplary embodiment, the error may be collected by using a local host method of ara::com.

In the exemplary embodiment, the error may be collected by a polling method. In the exemplary embodiment, the collecting of the integrated error may include: calling an application programming interface for checking whether the network management cluster, the time synchronization cluster, and the persistency cluster are normally operated; and checking a response to the call.

In the exemplary embodiment, the converting of the collected errors into the database may include: classifying the collected errors into an error for a diagnosis, an error for debugging, or an error for log; and converting each of the classified errors into the database.

In the exemplary embodiment, the performing of the recovery mechanism may include: monitoring configurations related to platform dependency; and performing reboot according to a result of the monitoring or interrupting the application.

In the exemplary embodiment, the recovery mechanism may be performed by using the collected error and customer specification callback information.

Another exemplary embodiment of the present invention provides a control unit for a vehicle, the control unit including: communication device configured to perform communication with an external device; a memory configured to store an error manager; and a micro-control unit configured to control the communication device and the memory, and drive the error manager, in which the error manager collects a user error occurring in an application for a vehicle, collects a platform error occurring in at least one of a platform health management cluster PHM, a statement management cluster SM, and an execution management cluster EM, or collects an integrated error according to whether a network management cluster NM, a time synchronization cluster TS, and a persistency cluster PER are normally operated, and converts the collected errors into a database in a form required for a diagnosis and debugging, and performs a recovery mechanism by interworking with the platform health management cluster, the statement management cluster, and the execution management cluster.

In the exemplary embodiment, the error manager may be implemented by an AUTomotive Open System Architecture (AUTOSAR) adaptive application. In the exemplary embodiment, the error manager may periodically monitor the network management cluster NM, the time synchronization cluster TS, and the persistency cluster PER.

In the exemplary embodiment, the error manager may periodically monitor whether at least one of functional clusters has an error through ara::api.

In the exemplary embodiment, the error manager may transmit customer specification callback information to user fail-safe logic of the application for the vehicle.

The control unit for the vehicle and the error management method thereof according to the exemplary embodiments of the present invention include the error manager collecting/managing the error of the platform, thereby actively processing the error of the platform.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Hereinafter, the accompanying drawings are for helping the present exemplary embodiment, and provide the exemplary embodiments together with the detailed description. However, the technical characteristic of the present exemplary embodiment is not limited to a specific drawing, and the characteristics disclosed in each drawing may be combined with each other to be formed as a new exemplary embodiment.

Figure 1:
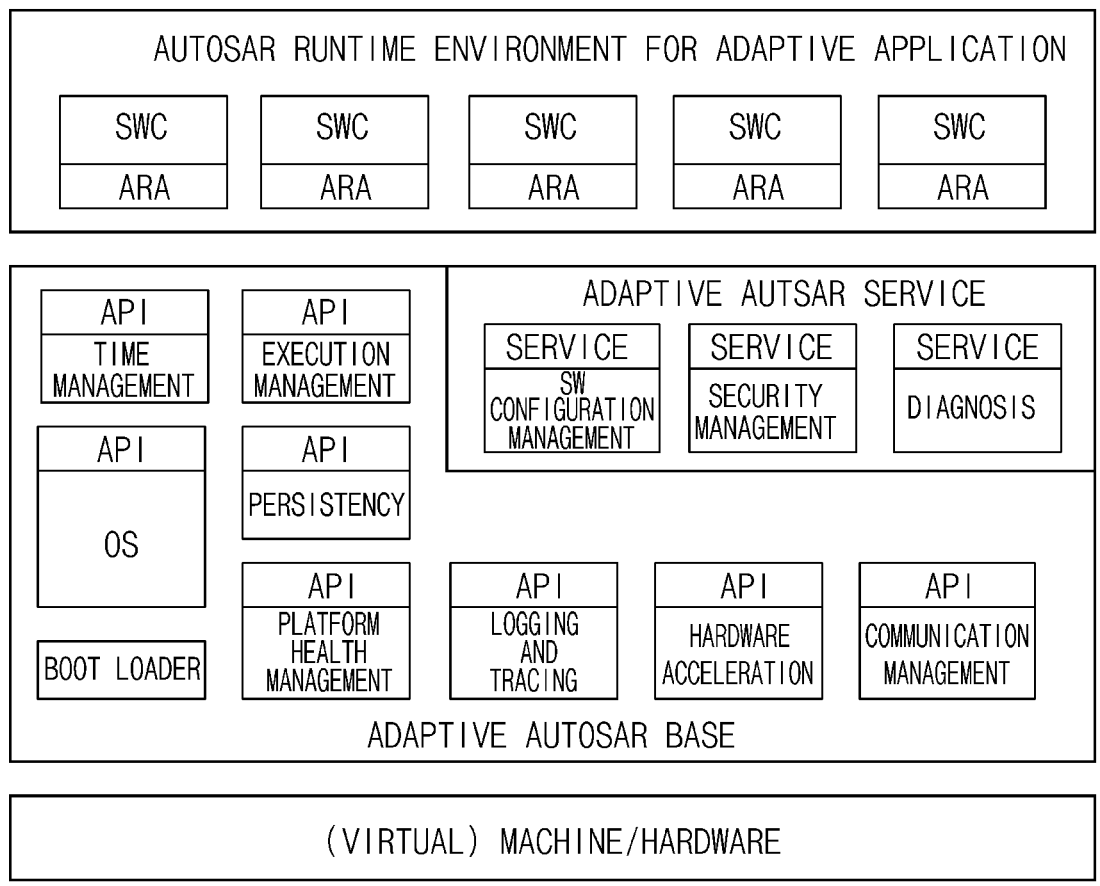
FIG. 1 is a diagram illustrating an architecture of an AUTomotive Open System Architecture (AUTOSAR) adaptive platform.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the contents of the present invention will be described clearly and in detail so that those skilled in the art can easily implement the present invention by using the drawings.

The present invention may have various modifications and various forms and thus specific exemplary embodiments will be illustrated in the drawings and described in detail in the context. However, it is not intended to limit the present invention to the specific disclosed form, and it will be appreciated that the present invention includes all modifications, equivalences, or substitutions included in the spirit and the technical scope of the present invention. Terms, such as first and second, may be used for describing various constituent elements, but the constituent elements are not limited by the terms.

The terms are used only to discriminate one constituent element from another constituent element. For example, without departing from the scope of the present invention, a first constituent element may be named as a second constituent element, and similarly a second constituent element may also be named as a first constituent element. It should be understood that when one constituent element is referred to as being "coupled to" or "connected to" another constituent element, one constituent element can be directly coupled to or connected to the other constituent element, but intervening elements may also be present. By contrast, when one constituent element is referred to as being "directly coupled to" or "directly connected to" another constituent element, it should be understood that there are no intervening elements.

Other expressions, that is, "between ~" and "just between ~" or "adjacent to ~" and "directly adjacent to ~", explaining a relationship between constituent elements, should be interpreted in a similar manner. Terms used in the present application are used only to describe specific exemplary embodiments, and are not intended to limit the present invention. Singular expressions used herein include plurals expressions unless they have definitely opposite meanings in the context.

Terms used in the present application are used only to describe specific exemplary embodiments, and are not intended to limit the present invention. Singular expressions used herein include plurals expressions unless they have definitely opposite meanings in the context. In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance. All terms used herein including technical or scientific terms have the same meanings as meanings which are generally understood by those skilled in the art unless they are differently defined. Terms defined in generally used dictionary shall be construed that they have meanings matching those in the context of a related art, and shall not be construed in ideal or excessively formal meanings unless they are clearly defined in the present application. FIG. 1 is a diagram illustrating an architecture of a general AUTomotive Open System Architecture (AUTOSAR) adaptive platform. Referring to FIG. 1, the adaptive platform provides functional clusters and basic services.

A Software Component (SWC) formalized and defined through an interface to Basic Software (BSW) is a component of the AUTOSAR architecture. The BSW module provides basic standard services, such as bus communication, memory management, IO access, systems, and diagnosis service. Other component of the AUTOSAR is a Runtime Environment (RTE), which controls connection between the SWCs or a connection from the SWC to the BSW. A Virtual Functional Bus (VFB) defined by the AUTOSAR provides a conceptual basis for using the communication between the SWCs and the BSW service. All of the communication of the SWC is based on the VFB, and thus, the SWC is independent of ECU hardware. Through this, the SWC may be reused in a project and a platform. The VFB may be executed by being connected with the BSW appropriately set for each ECU and supplying a specially set RTE.

Adaptive Applications (AAs) is operated based on an AUTOSAR Runtime for Adaptive Application (ARA). The ARA is configured of an Application Programming Interface (API) provided by a functional cluster belonging to foundation or services. The foundation provides basic functions of the Adaptive Platform (AP) and the service. All of the adaptive applications may provide other adaptive applications with services.

The adaptive platform includes a functional cluster for providing better services. The functional clusters include a time management cluster, an OS cluster, an execution management cluster, persistence cluster, a platform health management cluster, a logging and tracing cluster, a hardware acceleration cluster, and a communication management cluster. The functional clusters communicate with other applications through the API, respectively. Since only the API implementation is defined, the degree of implementation freedom of the functional cluster of the adaptive platform is much higher than that of the BSW stack implementation configuring the existing classic platform.

The basic service includes a SW configuration management service, a security management service, and a diagnosis service. The basic service may be called through ara::com (AUTOSAR Runtime for Adaptive Applications) of middleware nature.

The adaptive platform considers hardware executed by a machine. The hardware is virtualized by using various technologies. The hardware includes one or more machines. Only one AP instance is executed. A single chip/a plurality of chips hosting the machines are included on the hardware.

Figure 2:
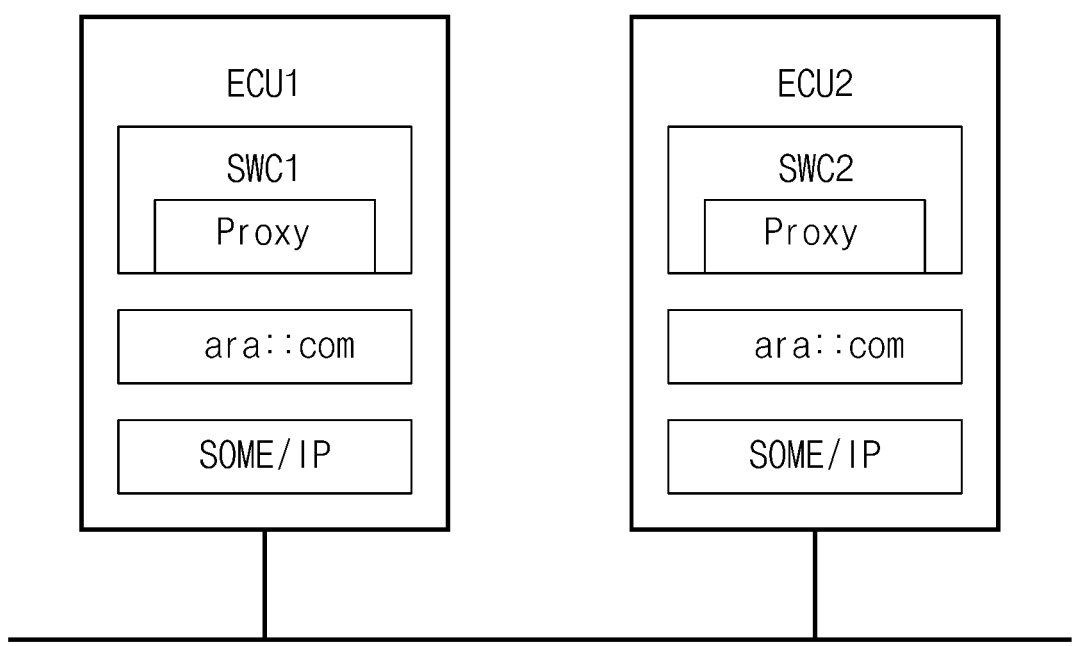
FIG. 2 is a diagram illustrating an example of proxy-skeleton service oriented communication through SOME/IP communication.

FIG. 2 is a diagram illustrating an example of proxy-skeleton service oriented communication through SOME/IP communication. The largest difference between the AUTOSAR adaptive platform and the classic platform is a communication method. Most of the existing classic platforms are based on a traditional signal-oriented communication. In the meantime, the adaptive platform is based on Service-Oriented Communication (SOC). The SOC is the communication method that dynamically connects a service required between Skeleton that is the server providing the service and a proxy that is a client consuming the service through the service discovery and the Scalable service-Oriented MiddlewarE over IP (SOME/IP). A vehicle application server is a system in which the AUTOSAR adaptive platform is mounted, and is capable of freely monitoring and controlling a smart sensor and a smart actuator through the SOME/IP according to the use of a vehicle application.

Figure 3:
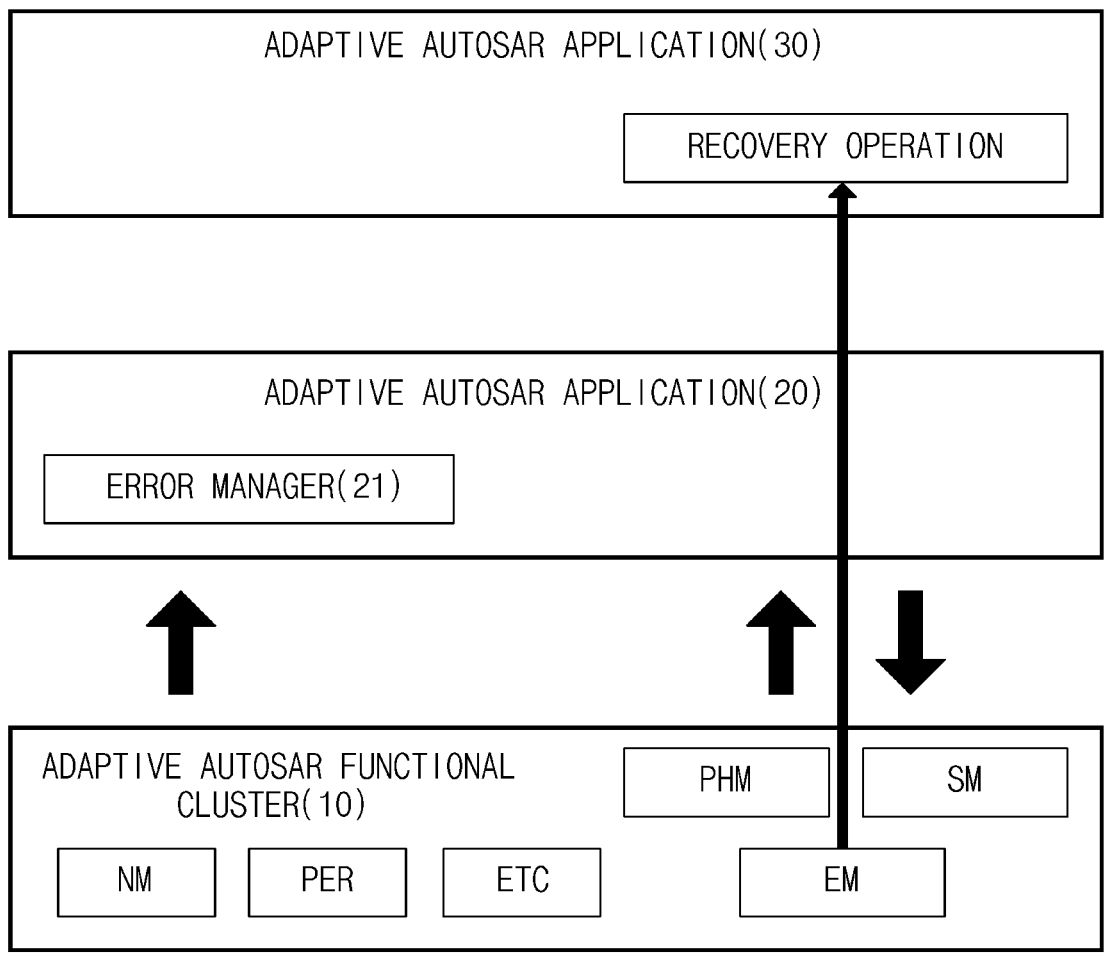
FIG. 3 is a diagram illustrating an operation of the AUTOSAR adaptive platform.

FIG. 3 is a diagram illustrating an operation of the general AUTOSAR adaptive platform.

An adaptive AUTOSAR application 20 includes an error manager 21.

The error manager 21 periodically monitors an error of a Network Management (NM), a PER, and an ETC. The error manager 21 checks whether there is an error in the adaptive AUTOSAR functional clusters 10 at each monitoring cycle through ara::api of each cluster.

When an abnormal symptom is found, the error manager 21 makes the adaptive AUTOSAR application 30 perform a recovery action by interlocking Platform Health Management (PHM), Statement Management (SM), and Execution Management (EM). Accordingly, the error operation is completed.

The PHM performs a monitoring function. The PHM performs control flow monitoring and external monitoring. The alive supervision monitors whether the periodical SWC is periodically executed well. Deadline Supervision monitors whether aperiodic-SWC is executed well between two given points. Logical Supervision monitors whether the sequence of SWC units is executed in a predetermined order. Health Channel Supervision monitors external factors related to health.

The PHM and the EM performs an error reading function. Watchdog Control supports hardware watchdog. Error Handling processes the error after the error is generated. The action of the PHM includes application termination or restart, reset platform instance, hardware watchdog, and a notification function. The application termination or restart means stop and restart of the SWC. The reset platform instance may reset the control unit itself. The hardware watchdog supports hardware watchdog. The notification function performs a notification when a corresponding problem occurs in the SWC that performs the safety role.

The SM manages the state of the ECU itself, receives an event from the adaptive platform and the SWC, controls on/off of a network by controlling the NM, and controls shutdown and restart of the system.

The EM takes a charge of a system execution management including platform initialization and start and termination of an application program. The EM operates together with an operating system, and performs runtime scheduling of the application program. In the exemplary embodiment, the monitoring cycle may be set. For example, the monitoring cycle is 1 ms, 10 ms, and 100 ms.

The EM performs startup and shutdown of the system, and controls the generation of a process of the adaptive platform and the application after booting, performs startup and shutdown of the SWC, and controls the application according to the SM.

The general adaptive AUTOSAR platform monitors an abnormal symptom of the system through an internal module, such as the PHM, the SM, and the EM, and performs restart/stop operation of the corresponding application when the abnormal symptom occurs. However, these are the functions of the respective modules, and the process of combining the functions to perform a recovery operation from the point at which the error substantially occurs is not included.

On the other hand, the adaptive AUTOSAR platform according to the exemplary embodiment of the present invention supplements the non-implemented part on an adaptive AUTOSAR OS.

Figure 4:
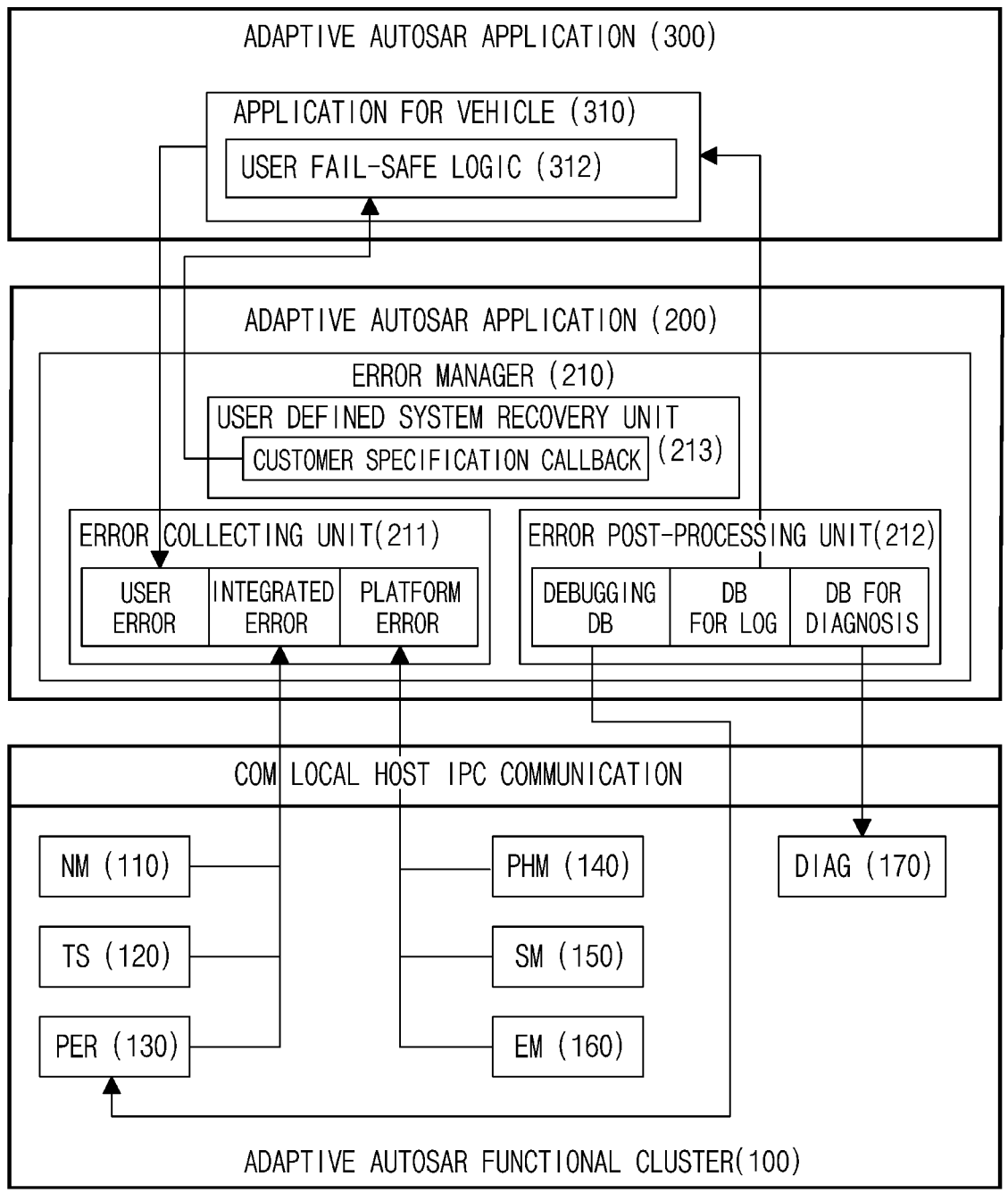
FIG. 4 is a diagram illustrating an operation of an AUTOSAR adaptive platform according to an exemplary embodiment of the present invention.

FIG. 4 is a diagram illustrating an operation of an AUTOSAR adaptive platform according to the exemplary embodiment of the present invention. Referring to FIG. 4, an adaptive AUTOSAR application 200 may include an error manager 210. The error manager 210 may include an error collection unit 211, an error post-processing unit 212, and a user defined system recovery unit 212.

The error collection unit 211 may collect a user error, a combined error, and a platform error. In the exemplary embodiment, the user error may be transmitted from a vehicle application 310. In the exemplary embodiment, the combined error may be transmitted from a network management (NM) 110, a time synchronization management (TS) 120, and a persistence management (PER) 130 of the adaptive AUTOSAR functional cluster 100. In the exemplary embodiment, the platform error may be transmitted from a platform health management (PHM) 140, a state management (SM) 150, and an execution management (EM) 160 of the adaptive AUTOSAR functional cluster 100.

The error post-processing unit 212 may include a debugging database (DB), a log DB, and a diagnosis DB. In the exemplary embodiment, the debugging DB may be transmitted to the PER 130. In the exemplary embodiment, the log DB may be transmitted to the vehicle application 310. In the exemplary embodiment, the diagnosis DB may be transmitted to a diagnosis module (DIAG) 170.

A user defined system recovery unit 213 may include a customer specification callback. In the exemplary embodiment, the customer specification callback may be transmitted to a user fail-safe logic 312.

The error manager 210 corresponds to an application of the adaptive AUTOSAR. The application may perform the following functions.

First, the error manager 210 may access the PHM 140, the SM 150, and the EM 160 through ara APIs, respectively.

Second, the error manager 210 may access the API which is capable of reading whether the NM 110, the TS 120, and the PER 130 have an error.

Third, the error manager 210 is the adaptive AUTORSA application and may always perform run in the unit of a process.

Fourth, the error manager 210 may monitor whether an error occurs through the defined API during a set period. In the exemplary embodiment, the cycle may be 1 s, 1 us, 1 ms, and 1 ns.

When the error occurs, the error manager 210 switches the states of the currently operated corresponding applications to the shutdown state through the SM 150, requests the shutdown operation for the currently operated application through the EM 160, and perform a recovery action in the corresponding application through the PHM 140.

As described above, the adaptive AUTOSAR platform according to the exemplary embodiment of the present invention may process the error based on the adaptive AUTOSAR OS through the error manager 210.

In general, the adaptive AUTSAR provides the SW function capable of processing an error, and the technology capable of actively processing an actual error is not included in the OS specification. By internalizing and distributing the foregoing part to tiers, stable and even quality SW may be mass-produced. In particular, the error processing is an essential matter in the development area of the tiers. Accordingly, various requirements may be gathered from tiers and customers, and the scope of application may be varied.

In the exemplary embodiment, the error manager 210 may periodically monitor whether an error occurs. For example, the error manager 210 checks whether there is an error in the adaptive AUTOSAR functional clusters modules at each monitoring cycle through ara::api of each cluster. In the exemplary embodiment, the error monitoring cycle may be set by the user.

The error collecting unit 211 may perform transmission and reception by using a local host method of ara::com (which is similar to the communication in the form of IPC of the POSIX OS, and is commonly established with a shared memory). In the exemplary embodiment, the communication may be operated by a polling method. This may reduce the load of the system.

In the exemplary embodiment, the error collecting unit 211 may collect a user error occurring in the vehicle application 300.

In the exemplary embodiment, the error collecting unit 211 may collect a platform error occurring in a Functional Cluster (FC) of the adaptive AUTOSAR.

In the exemplary embodiment, the error collecting unit 211 may collect comprehensive errors. For example, the error collecting unit 211 may call an API capable of checking whether the NM 110, the TS 120, and the PER 130 are normally operated, and checks a response thereof, and when the response is not appropriate, the error collecting unit 211 may determine that an integrated error occurs.

The error post-processing unit 212 may convert the collected errors into a database in the form required for diagnosis and debugging as follow.

The error DB for the diagnosis is the database based on an error code, a description, and a diagnosis parameter to be transmitted to a diagnosis device. An output form may include a diagnosis specification.

The error DB for analyzing the system is the database of the error for debugging. For example, the debugging DB may store an error log through the PER 130. An output form may be in the form of DLT.

The DB for log is the database in the form of log so that the vehicle application is capable of processing an appropriate exception. An output form may be in the form of printf.

The user defined system recovery unit 213 may include a recovery mechanism of the adaptive AUTOSAR performed while interworking with the PHM 140, the SM 150, and the EM 160. The recovery mechanisms may monitor only the elements completely controlled by platform dependency, and perform a response (recovery functions, such as rebutting and application interruption).

In the exemplary embodiment, the user defined system recovery unit 213 may connect a body region of a callback function defined by a customer company and the present "user defined system recovery" region through callback in the form of a function pointer. In the exemplary embodiment, the customer company may directly newly define and use the recovery operation based on the collected error and the policy defined by the customer company.

For example, logic to monitor whether the PCI express interface is fail-safe is required. When the customer company cannot set the corresponding function because the monitoring is not reflected to a user configuration of the PHM 140 of the adaptive AUTOSAR, a normal operation of the PCI express interface cannot be observed. Through the foregoing part, it is possible to add a function of directly monitoring the PCI express by the customer company when the corresponding collected error occurs. The Fail-Safe region control logic is established in the form of CDD of the classic AUTOSAR.

Figure 5:
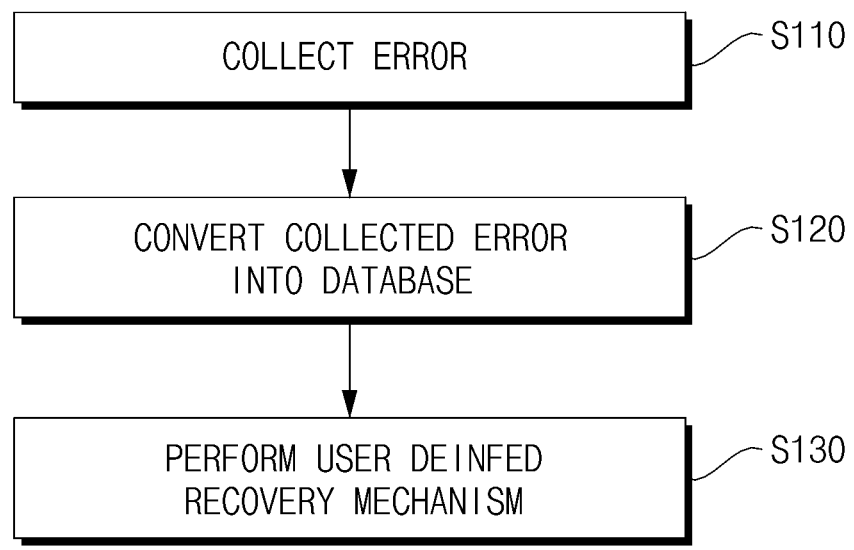
FIG. 5 is a flowchart illustrating an example of a method of operating an error manager of an application of the AUTOSAR adaptive platform according to the exemplary embodiment of the present invention.

FIG. 5 is a flowchart illustrating an example of a method of operating the error manager of the application of the AUTOSAR adaptive platform according to the exemplary embodiment of the present invention. Referring to FIGS. 3 to 5, the error manager 210 (see FIG. 3) may operate as follows.

The error manager 210 may collect an error from at least one functional cluster or another adaptive application (S110). For example, the error manager 210 may periodically monitor the NM, the TS, and the PER of the functional cluster and collect an integrated error, collect a user error from the vehicle application, or collect platform errors output from the PHM, the SM, and the EM.

The error manager 210 may convert the collected user errors, integrated errors, platform errors, and the like into a database (120). For example, the error manager 210 may convert the errors for debugging into a database, convert error codes, descriptions, and diagnosis parameters to be transmitted to a diagnosis device into a database, or convert the collected errors into a database in the form of a log so that the collected error is processed as an exception in the vehicle application.

The error manager 210 may perform a user defined recovery mechanism of the adaptive AUTOSAR application by interworking with the PHM, the SM, and the EM of at least one functional cluster (S130).

The steps and/or operations according to the present invention may occur in different orders, or in parallel, or simultaneously in different exemplary embodiments for different epochs and the like as may be appreciated by those skilled in the art. Depending on the exemplary embodiment, a part or the entirety of the steps and/or operations may be implemented or performed by using commands stored in one or more non-temporary computer-readable media, a program, an interactive data structure, and one or more processors driving a client and/or a server. One or more non-temporary computer-readable media are, for example, software, firmware, hardware, and/or any combination thereof. Further, the function of "module" discussed in the present specification may be implemented by software, firmware, hardware, and/or any combination thereof.

Figure 6:
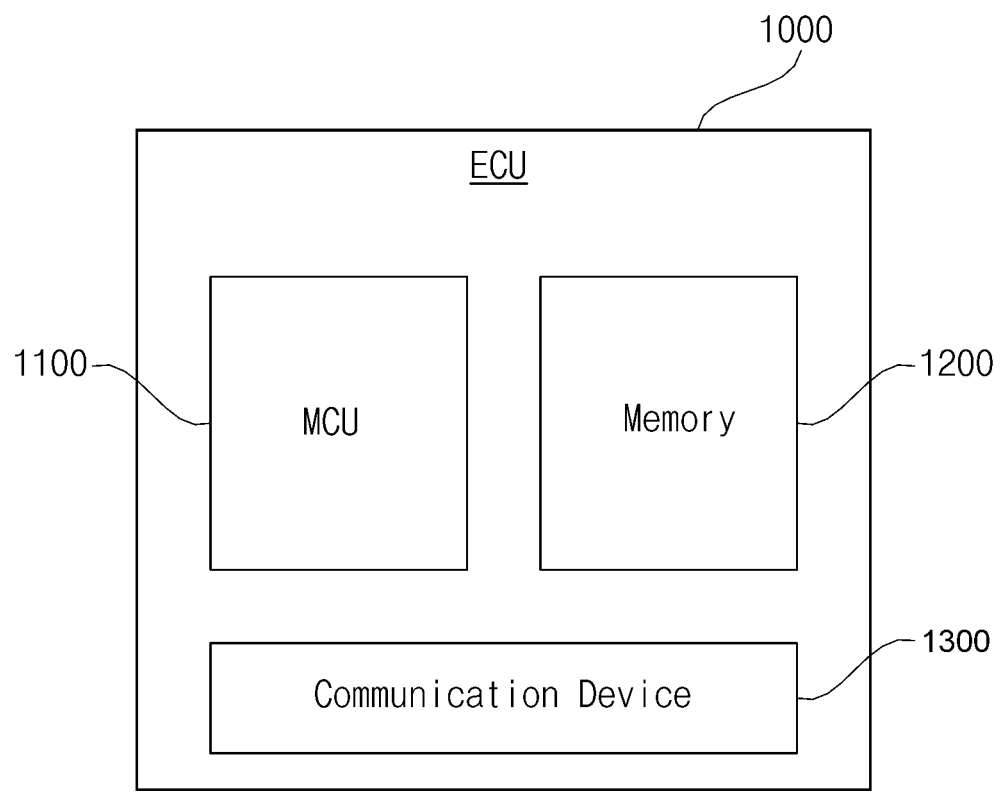
FIG. 6 is a diagram illustrating an example of an electronic control unit 1000 for a vehicle according to the exemplary embodiment of the present invention.

FIG. 6 is a diagram illustrating an example of an electronic control unit 1000 for a vehicle according to the exemplary embodiment of the present invention. Referring to FIG. 6, an electronic control unit (ECU) 1000 for a vehicle may include a Micro Control Unit (MCU) 1100, a memory 1200, and a communication device 1300.

The MCU 1100 may be implemented so as to perform the general operation of the ECU 1000 for the vehicle. The MCU 1100 may drive at least one program by executing at least one instruction. For example, at least one program may include the adaptive AUTOSAR application described with reference to FIGS. 3 to 5.

The MCU 1100 may include a plurality of cores. The plurality of cores may include at least one main core and at least one sub cores.

The memory 1200 may be implemented to store at least one program. The memory 1200 may include a volatile memory or a non-volatile memory. For example, the memory 1200 may include a storage medium, such as a Random Access Memory (RAM), a Static Random Access Memory (SRAM), a Read-Only Memory (ROM), a Programmable Read-Only Memory (PROM), an Electrically Erasable Programmable Read-Only Memory (EEPROM), a NAND Flash memory, and a NOR Flash memory.

The communication device 1300 serves as an interface capable of establishing communication with the outside of the ECU 1000 for the vehicle. In general, for the communication with the ECU 1000 for the vehicle and the external device of the ECU 1000 for the vehicle, Controller Area Network (CAN) communication, Local Interconnect Network (LIN) communication, and Ethernet communication may be used.

One or more non-transitory computer-readable media and/or means for implementing/performing one or more operations/steps/modules of the exemplary embodiments of the present invention may include controllers including Application-Specific Integrated Circuits (ASICs), standard integrated circuits, and micro-controllers performing appropriate commands, and/or an embedded controller, Field-Programmable Gate Arrays (FPGAs), Complex Programmable Logic Devices (CPLDs), and the equivalent devices thereof, but the present invention is not limited thereto.

In the meantime, the contents of the present invention are merely the particular exemplary embodiments for implementing the invention. The present invention will include not only concrete and practically usable means, but also technical ideas, which are abstract and conceptual ideas that can be utilized as technologies in the future.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of managing an error of a control unit for a vehicle, the method comprising:
   collecting the error;
   converting the error that is collected into a database in a form required for a diagnosis and debugging; and
   performing a recovery mechanism by interworking a platform health management cluster (PHM), a statement management cluster (SM), and an execution management cluster (EM),
   wherein the collecting of the error includes:

collecting a user error occurring in an application for the vehicle;

collecting a platform error occurring in at least one of the platform health management cluster (PHM), the statement management cluster (SM), and the execution management cluster (EM); or collecting an integrated error according to whether a network management cluster (NM), a time synchronization cluster (TS), and a persistency cluster (PER) are normally operated.

2. The method of claim 1, further comprising:
periodically monitoring whether the error occurs.

3. The method of claim 1, wherein the error is collected by using a local host method of ara::com.

4. The method of claim 1, wherein the error is collected by a polling method.

5. The method of claim 1, wherein the collecting of the integrated error includes:

calling an application programming interface for checking whether the network management cluster (NM), the time synchronization cluster (TS), and the persistency cluster (PER) are normally operated; and checking a response to the calling.

6. The method of claim 1, wherein the converting of the error that is collected into the database includes:

classifying the error that is collected into an error for a diagnosis, an error for debugging, or an error for log; and converting each of the error for the diagnosis, the error for the debugging and the error for the log into the database.

7. The method of claim 1, wherein the performing of the recovery mechanism includes:

monitoring configurations related to platform dependency; and performing a reboot according to a result of the monitoring of the configurations, or interrupting the application for the vehicle.

8. The method of claim 1, wherein the recovery mechanism is performed by using the error that is collected and customer specification callback information.

9. A control unit for a vehicle, comprising:

a communication interface configured to perform communication with an external device;

a memory configured to store an error manager; and a micro-control unit configured to control the communication interface and the memory, and to drive the error manager, wherein the error manager is configured to:

collect a user error occurring in an application for a vehicle, collect a platform error occurring in at least one of a platform health management cluster (PHM), a statement management cluster (SM), and an execution management cluster (EM), or collect an integrated error according to whether a network management cluster (NM), a time synchronization cluster (TS), and a persistency cluster (PER) are normally operated;

convert the user error, the platform error, or the integrated error that is collected into a database in a form required for a diagnosis and debugging; and perform a recovery mechanism by interworking with the platform health management cluster (PHM), the statement management cluster (SM), and the execution management cluster (EM).

10. The control unit of claim 9, wherein the error manager is implemented by an AUTomotive Open System Architecture (AUTOSAR) adaptive application.

11. The control unit of claim 9, wherein the error manager is further configured to periodically monitor the network management cluster (NM), the time synchronization cluster (TS), and the persistency cluster (PER).

12. The control unit of claim 9, wherein the error manager is further configured to periodically monitor whether at least one of functional clusters has an error through ara::api.

13. The control unit of claim 9, wherein the error manager is further configured to transmit customer specification callback information to user fail-safe logic of the application for the vehicle.

* * * * *